United States Patent [19]
Nerone

[11] Patent Number: 6,051,934
[45] Date of Patent: Apr. 18, 2000

[54] GAS DISCHARGE LAMP BALLAST CIRCUIT WITH HIGH SPEED GATE DRIVE CIRCUITRY

[75] Inventor: Louis R. Nerone, Brecksville, Ohio

[73] Assignee: General Electric Company, Schenectady, N.Y.

[21] Appl. No.: 09/133,588

[22] Filed: Aug. 13, 1998

[51] Int. Cl.[7] .................................................... H05B 37/02
[52] U.S. Cl. .................... 315/209 R; 315/219; 315/244; 315/224; 315/DIG. 5; 315/DIG. 7
[58] Field of Search ............................... 315/209 R, 219, 315/224, 225, 244, 248, DIG. 2, DIG. 5, DIG. 7

[56] References Cited

U.S. PATENT DOCUMENTS

| | | | |
|---|---|---|---|
| 5,144,205 | 9/1992 | Motto et al. ............................... | 315/244 |
| 5,402,043 | 3/1995 | Nilssen ...................... | 315/307 |
| 5,440,209 | 8/1995 | Nilssen ...................... | 315/219 |
| 5,446,350 | 8/1995 | El-Hamamsy et al. .................. | 315/248 |
| 5,459,375 | 10/1995 | Nilssen ...................... | 315/247 |
| 5,796,214 | 8/1998 | Nerone .................. | 315/209 R |

Primary Examiner—Haissa Philogene

[57] ABSTRACT

A ballast circuit for a gas discharge lamp with high speed gate drive circuitry comprises a resonant load circuit including a resonant inductance, a resonant capacitance, and circuitry for connecting to a gas discharge lamp. A d.c.-to-a.c. converter circuit induces a.c. current in the load circuit, and comprises a pair of switches serially connected between a bus conductor at a d.c. voltage and a reference conductor, the voltage between a reference node and a control node of each switch determining the conduction state of the associated switch. The reference nodes of the switches are connected together at a common node through which the a.c. current flows, and the control nodes of the switches are connected together. A gate drive arrangement for regeneratively controlling the switches comprises a driving inductor connected between the common node and the control nodes and mutually coupled to an inductor in the load circuit for sensing current in the circuit. A bidirectional voltage clamp is connected between the common and control nodes. The clamp comprises a first Zener diode with an associated, serially connected, one-way current valve connected between the control and common nodes, and poled in one direction; and a second Zener diode with an associated, serially connected, one-way current valve connected between the control and common nodes, and poled in an opposite direction. The valves are connected to the diodes in a way to prevent the diodes from operating in a forward-biased mode, and have shorter reverse recovery times than reverse recovery times of the diodes.

8 Claims, 1 Drawing Sheet

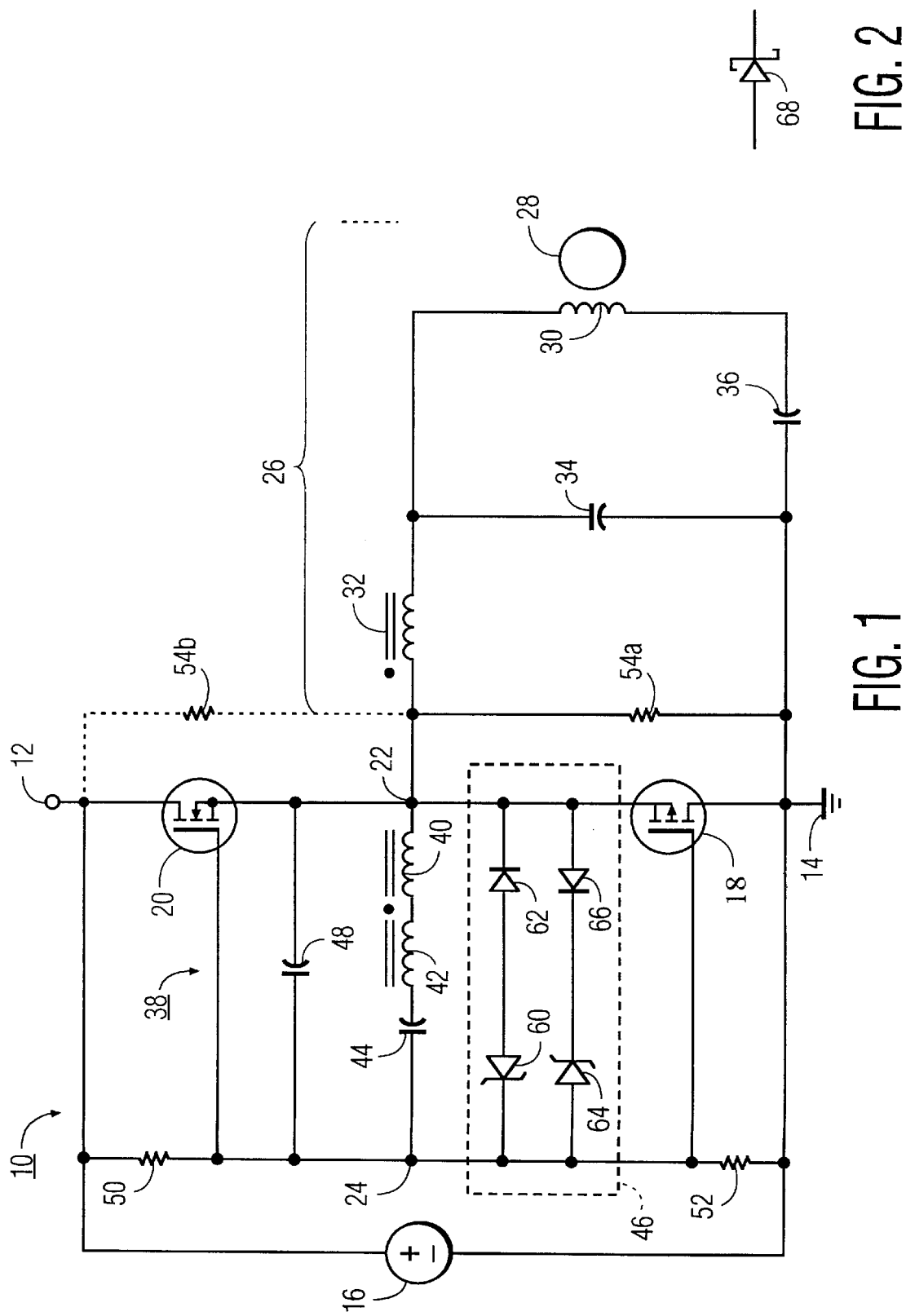

GAS DISCHARGE LAMP BALLAST CIRCUIT WITH HIGH SPEED GATE DRIVE CIRCUITRY

CROSS-REFERENCE TO RELATED APPLICATION

This application is related to commonly owned application Ser. No. 08/709,062 filed on Sep. 6, 1996, now U.S. Pat. No. 5,796,214, entitled "Ballast Circuit for Gas Discharge Lamp," by Louis R. Nerone, the present inventor.

FIELD OF THE INVENTION

The invention relates to a ballast, or power-supply, circuit for a gas discharge lamp employing serially coupled d.c.-to-a.c. converter switches of opposite conduction modes, controlled by regenerative gate drive circuitry. More particularly, it relates to such a ballast circuit employing high speed gate drive circuitry.

BACKGROUND OF THE INVENTION

The above-identified co-pending application Ser. No. 08/709,062 now U.S. Pat. No. 5,796,214 discloses and claims a ballast circuit for a gas discharge lamp. The ballast circuit includes a d.c.-to-a.c. converter formed of a pair of serially connected switches having opposite conduction modes. For instance, one switch may be an n-channel enhancement mode MOSFET, and the other, a p-channel enhancement mode MOSFET, with their sources interconnected at a common node. This allows a single control voltage applied to the gates, or control nodes, of the MOSFETs, to alternately switch on one MOSFET and then the other. The gate drive circuitry disclosed employs a bidirectional voltage clamp implemented by a pair of back-to-back connected Zener diodes.

The present inventor has discovered a new configuration for a bidirectional voltage clamp, which allows for higher speed operation and more reliable lamp starting.

SUMMARY OF THE INVENTION

An exemplary embodiment of the invention provides a ballast circuit for a gas discharge lamp with high speed gate drive circuitry. The ballast comprises a resonant load circuit including a resonant inductance, a resonant capacitance, and means for connecting to a gas discharge lamp. A d.c.-to-a.c. converter circuit is coupled to the resonant load circuit for inducing a.c. current therein. The converter circuit comprises a pair of switches serially connected between a bus conductor at a d.c. voltage and a reference conductor, the voltage between a reference node and a control node of each switch determining the conduction state of the associated switch. The respective reference nodes of the switches are connected together at a common node through which the a.c. current flows, and the respective control nodes of the switches are connected together. A gate drive arrangement for regeneratively controlling the switches comprises a driving inductor connected between the common node and the control nodes and mutually coupled to an inductor in the resonant load circuit for sensing current in the circuit. A bidirectional voltage clamp is connected between the common node and the control nodes. The clamp comprises a first Zener diode with an associated, serially connected, one-way current valve connected between the control nodes and the common node, and poled in one direction; and a second Zener diode with an associated, serially connected, one-way current valve connected between the control nodes and the common node, and poled in an opposite direction. The valves are connected to their associated Zener diodes in such manner as to prevent the diodes from operating in a forward-biased mode, and have shorter reverse recovery times than reverse recovery times of their associated Zener diodes.

The foregoing lamp ballast circuit can attain higher speed operation and more reliable lamp starting than the ballast circuit disclosed in the above-identified, co-pending application.

DESCRIPTION OF THE DRAWINGS

FIG. 1 is a schematic diagram of a ballast circuit for an electrodeless lamp in accordance with the invention.

FIG. 2 is a detail view an alternative, one-way current valve for use in the ballast circuit of FIG. 1.

DETAILED DESCRIPTION OF THE INVENTION

FIG. 1 shows a ballast circuit 10 employing features of the invention. Ballast circuit 10 includes a bus node 12 and reference node 14, between which a d.c. bus voltage 16 exists. A d.c.-to-a.c. converter is realized through the employment of an upper switch 18 and a lower switch 20 serially interconnected at a common node 22. For instance, switch 18 may be an n-channel enhancement mode MOSFET, and switch 20, a p-channel enhancement mode MOSFET, with their sources connected together at node 22. The gates, or control nodes, of MOSFETs 18 and 20 are connected together at a control node 24.

A load circuit 26 includes an electrodeless lamp 28, which is powered by radio frequency (r.f.) energy supplied by an r.f. inductor 30. A resonant inductor 32 cooperates with a resonant capacitor 34 to set the resonant frequency of load circuit 36. A capacitor 36 blocks d.c. current from the load circuit.

A gate drive circuit generally designated 38 controls operation of switches 18 and 20 and includes a driving inductor 40 mutually coupled to inductor 32, with polarity as indicated by the dots in FIG. 1. Voltage proportional to current in the load circuit is induced in inductor 40, which, in turn, provides driving power for control circuit 38. Preferably coupled to inductor 40 is a second inductor 42. A capacitor 44 is preferably included for initially charging up to a level at which one of switches 18 or 20 turns on.

A further inductor (not shown) is optionally coupled in parallel to driving inductor 40; for instance, such further inductor may be shunted across the serial combination of inductors 40 and 42. The further inductor allows accommodation of a narrow range of turns ratios as between inductors 32 and 40, which may occur, for instance, if inductor 32 has a relatively few numbers of turns. This beneficially increases flexibility in designing gate drive circuit 38.

Circuit 38 preferably includes a bipolar voltage clamp 46, which cooperates with second inductor 42 in such manner that the phase angle between the fundamental frequency component of voltage across load circuit 26 (e.g., between nodes 22 and 14) and the a.c. current in the load circuit (e.g., in resonant inductor 32) approaches zero during lamp ignition. Clamp 46 will be described in more detail below.

A capacitor 48 is also preferably included between nodes 22 and 24, to increase the dead-time intervals when both switches are off. Capacitor 48 is essentially in parallel with capacitor 44 while the latter initially charges up to a level at which one of the switches turns on.

For providing power for starting regenerative operation of gate drive circuit 38, a resistor 50 is connected between bus node 12 and control node 24, and a further resistor 52 is connected between reference node 14 and control node 24. A cooperating resistor 54a is connected between common node 22 and reference node 14. The resulting resistor network 50, 52 and 54a provides a charging path for capacitor 44 from bus voltage 16. When the voltage between nodes 24 and 22, i.e., the gate-to-source voltage of MOSFET switches 18 and 20, reaches the threshold voltage for the upper switch 18 to turn on, current begins to flow in the load circuit. Such load current is fed back to driving inductor 40 by inductor 32, so that regenerative operation of circuit 38 occurs. For turning on lower switch 20 first, resistor 54b, shown in dashed lines, can be used instead of resistor 54a.

One possible modification of the foregoing resistor network is to delete resistor 52, and keep resistor 54a. Another modification is to, alternatively, delete resistor 50 and use resistor 54b rather than resistor 54a. In such case, capacitor 44 during starting charges up to the opposite polarity, causing the lower switch 20 to turn on first.

Bipolar voltage clamp 46 is connected between control node 24 and common node 22, and results in high speed operation of gate drive circuit 38. Clamp 46 comprises a Zener diode 60 associated with a high speed p-n diode 62 or other one-way current valve, and a Zener diode 64 associated with a high speed p-n diode 66 or other one-way current valve. Diodes 62 and 66 prevent their associated Zener diodes from operating in a forward-biased mode. Thus, Zener diode 60 may conduct from right to left in FIG. 1 in a reverse-biased mode, consistent with forward-biased operation of p-n diode 62; and Zener diode 64 may conduct from left to right in a reverse-biased mode, consistent with forward-biased conduction of p-n diode 66. In these conduction modes, the Zener diodes respectively act as clamps to voltage between nodes 24 and 22 in either polarity.

Compared with the Zener diodes, high speed p-n diodes 62 and 66 have a lower reverse recovery time, i.e., the time to dissipate minority carriers in the vicinity of the p-n junction and transition from a low impedance state to a high impedance state. Preferably, p-n diodes 62 and 66 have substantially lower reverse recovery times than the Zener diodes, e.g, no more than one-tenth the time of the Zener diodes. They may comprise so-called signal diodes. Other one-way current valves, such as Schottky diode 68 shown in FIG. 2 could be used instead of a p-n diode.

By preventing the Zener diodes from operating in a forward-biased mode, the longer, and typically irregular, reverse recovery times of the Zener diodes are avoided. This allows gate drive circuit 38 to be more responsive to changes in current in load circuit 26 (via a feedback link including driving inductor 40) when operating at high frequency, such as 2.5 MHZ. Consequently, during lamp starting, load circuit 26 can be driven more closely to its resonant frequency, resulting in greater starting reliability, and reduced lamp failures during starting.

In one experiment, the present inventor discovered the use of signal diodes 62 and 66 resulted in raising the starting load current from an irregular (i.e., significantly varying) level of about 7 amps to a much more constant level of about 10 amps, greatly enhancing start reliability.

Exemplary component values for the circuit of FIG. 1, used in the foregoing experiment, are as follows for a lamp 28 rated at 20 watts, with a d.c. bus voltage of 150 volts:

Resonant inductor 32 22 micro henries
Driving inductor 40 22 nano henries
Turns ratio between inductors 32 and 40 32:1
Second inductor 42 1.2 micro henries
Resonant capacitor 34 680 picofarads
D.c. blocking capacitor 36 3.3 nano farads
Capacitor 44 10 nano farads
Capacitor 48 1000 pico farads
Resistors 50, 52, 54a, and 54b, each 560 k ohms Additionally, Zener diodes 60 and 64 may be 7.5-volt diodes with product no. 1N5236B, made by Microsemi Scottsdale of Scottsdale, Ariz. P-n diodes 62 and 66 may be signal diodes with product no. 1N4148 made by Microsemi Chatsworth of Chatsworth, Calif. Shottky diodes, instead of the p-n diodes, may be diodes with product no. 1N5817, made by Microsemi Chatsworth of Chatsworth, Calif. Switch 18 may be an IRFR214, n-channel, enhancement mode MOSFET, sold by International Rectifier Company, of El Segundo, Calif.; and switch 20, an IRFR9214, p-channel, enhancement mode MOSFET also sold by International Rectifier Company.

While the invention has been described with respect to specific embodiments by way of illustration, many modifications and changes will occur to those skilled in the art. For instance, driving inductor 40 could be mutually coupled to r.f. inductor 30, which may obviate the need for resonant inductor 32. Further, the lamp could be an electroded lamp rather than the electrodeless type shown. It is therefore, to be understood that the appended claims are intended to cover all such modifications and changes as fall within the true spirit and scope of the invention.

What is claimed is:

1. A ballast circuit for a gas discharge lamp with high speed gate drive circuitry, comprising:
    (a) a resonant load circuit including a resonant inductance, a resonant capacitance, and means for connecting to a gas discharge lamp;
    (b) a d.c.-to-a.c. converter circuit coupled to said resonant load circuit for inducing a.c. current therein, said converter circuit comprising:
        (i) a pair of switches serially connected between a bus conductor at a d.c. voltage and a reference conductor, the voltage between a reference node and a control node of each switch determining the conduction state of the associated switch;
        (ii) the respective reference nodes of said switches being connected together at a common node through which said a.c. current flows, and the respective control nodes of said switches being connected together; and
    (c) a gate drive arrangement for regeneratively controlling said switches, comprising:
        (i) a driving inductor connected between said common node and said control nodes and mutually coupled to an inductor in said resonant load circuit for sensing current in said circuit; and
        (ii) a bidirectional voltage clamp connected between said common node and said control nodes;
    (d) said clamp comprising:
        (i) a first Zener diode with an associated, serially connected, one-way current valve connected between said control nodes and said common node, and poled in one direction;
        (ii) a second Zener diode with an associated, serially connected, one-way current valve connected between said control nodes and said common node, and poled in an opposite direction;
        (iii) said valves being connected to their associated Zener diodes in such manner as to prevent said diodes from operating in a forward-biased mode; and (iv) said valves having shorter reverse recovery times than reverse recovery times of their associated Zener diodes.

2. The ballast circuit of claim 1, wherein the reverse recovery times of said valves are substantially lower than the reverse recovery times of their associated Zener diodes.

3. The ballast circuit of claim 1, wherein each of said valves comprises one of a p-n diode and a Schottky diode.

4. The ballast circuit of claim 1, wherein said lamp is an electrodeless lamp.

5. A ballast circuit for a gas discharge lamp with high speed gate drive circuitry, comprising:
   (a) a resonant load circuit including a resonant inductance, a resonant capacitance, and means for connecting to a gas discharge lamp;
   (b) a d.c.-to-a.c. converter circuit coupled to said resonant load circuit for inducing a.c. current therein, said converter circuit comprising:
      (i) a pair of switches serially connected between a bus conductor at a d.c. voltage and a reference conductor, the voltage between a reference node and a control node of each switch determining the conduction state of the associated switch;
      (ii) the respective reference nodes of said switches being connected together at a common node through which said a.c. current flows, and the respective control nodes of said switches being connected together; and
   (c) a gate drive arrangement for regeneratively controlling said switches, comprising:
      (i) a driving inductor connected between said common node and said control nodes and mutually coupled to an inductor in said resonant load circuit for sensing current in said circuit;
      (ii) a second inductor serially connected to said driving inductor, and together with said driving inductor being connected between said common node and said control nodes; and
      (iii) a bidirectional voltage clamp connected between said common node and said control nodes; said clamp cooperating with said second inductor in such manner that the phase angle between the fundamental frequency component of voltage across said resonant load circuit and said a.c. current approaches zero during lamp ignition;
   (d) said clamp comprising:
      (i) a first Zener diode with an associated, serially connected, one-way current valve connected between said control nodes and said common node, and poled in one direction;
      (ii) a second Zener diode with an associated, serially connected, one-way current valve connected between said control nodes and said common node, and poled in an opposite direction;
      (iii) said valves being connected to their associated Zener diodes in such manner as to prevent said diodes from operating in a forward-biased mode; and
      (iv) said valves having shorter recovery times than reverse recovery times of their associated Zener diodes.

6. The ballast circuit of claim 5, wherein the reverse recovery times of said valves are substantially lower than the reverse recovery times of their associated Zener diodes.

7. The ballast circuit of claim 5, wherein said valves comprise one of a p-n diode and a Schottky diode.

8. The ballast circuit of claim 5, wherein said lamp is an electrodeless lamp.

* * * * *